Figure 6:
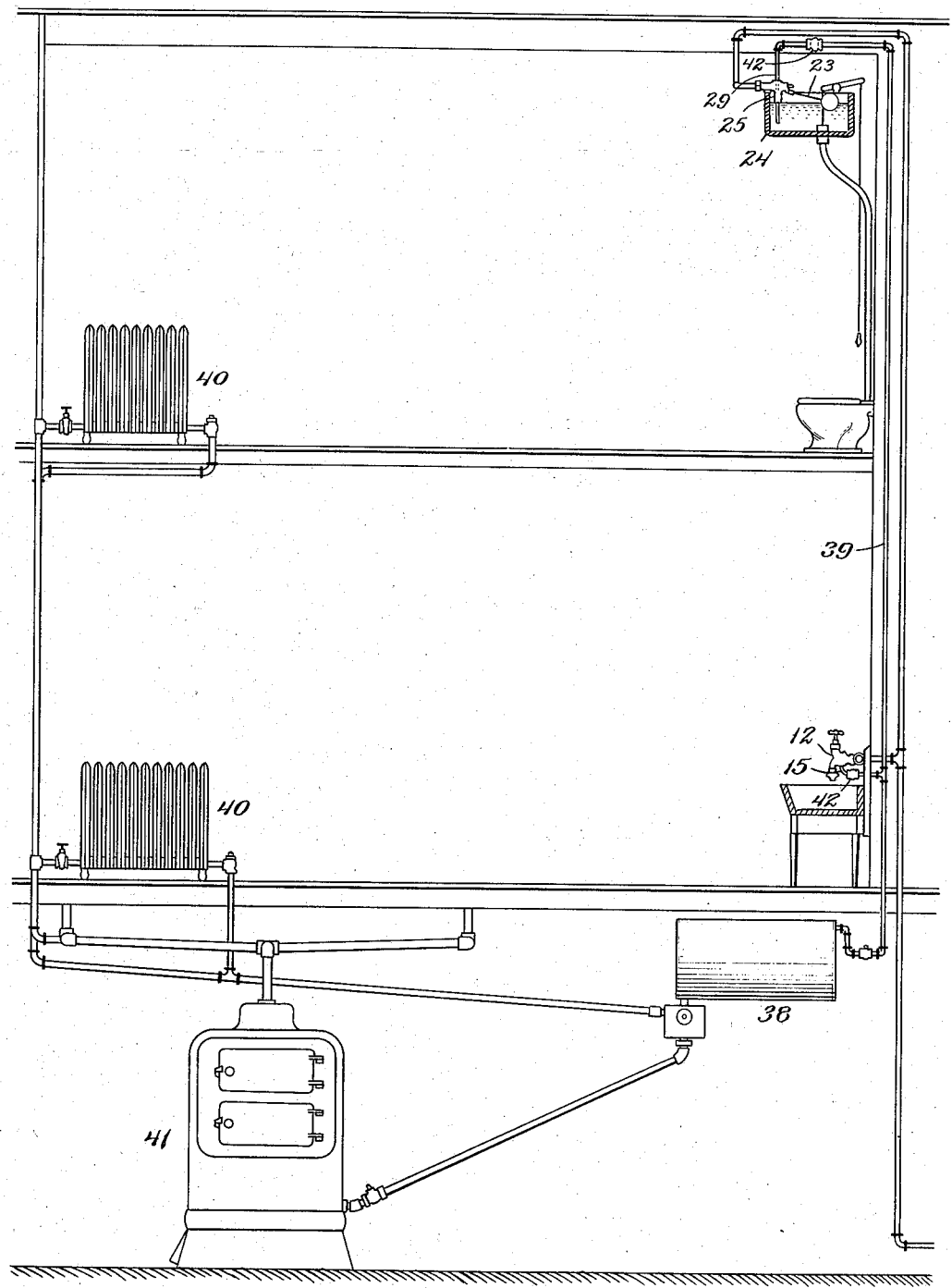

No. 881,548. PATENTED MAR. 10, 1908.
C. A. CLAFLIN.
AIR EXHAUSTING LIQUID SUPPLY APPARATUS.
APPLICATION FILED OCT. 9, 1907.
2 SHEETS—SHEET 1.
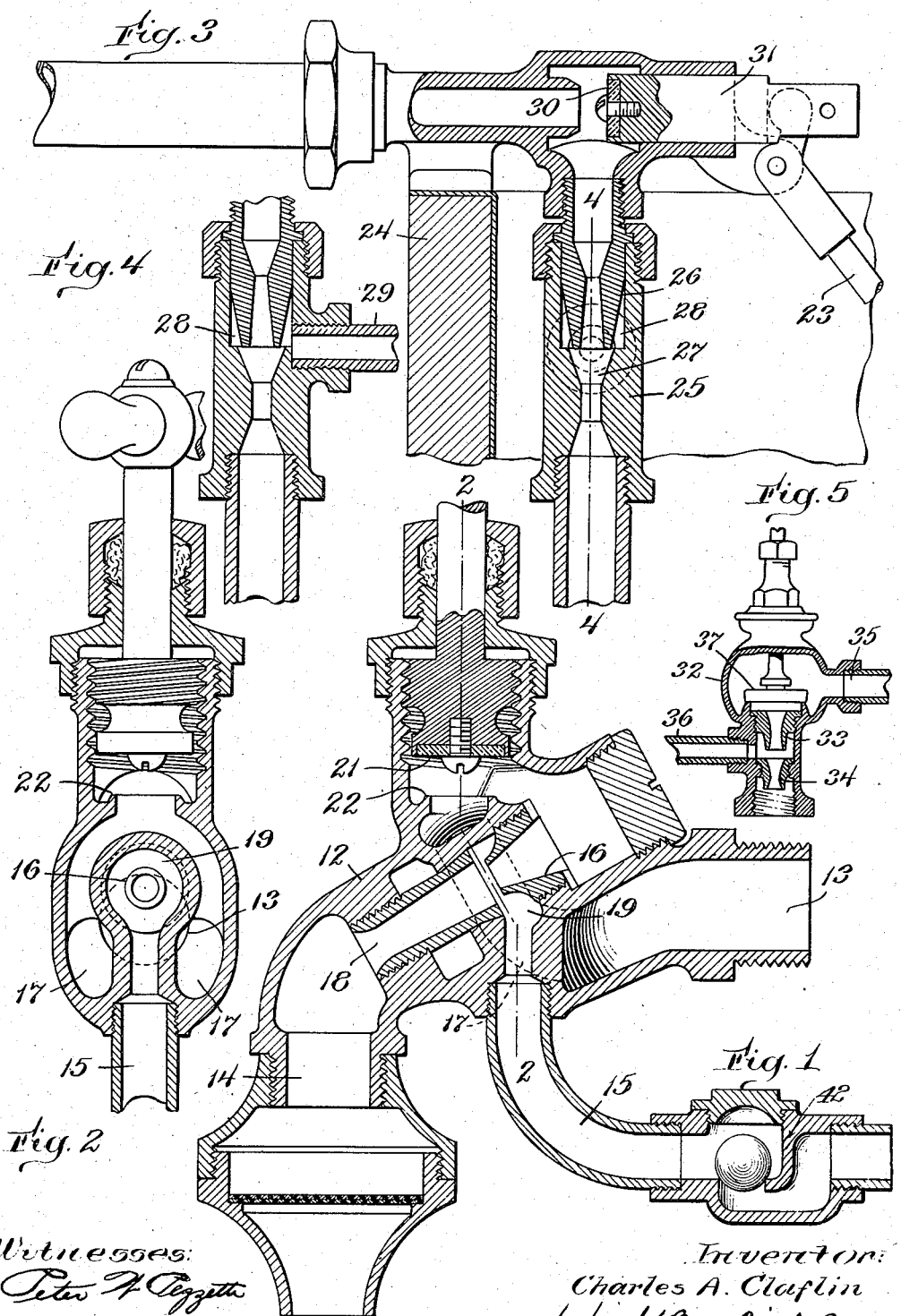
Witnesses:
Peter H. Pezzetti
E. Batchelder
Inventor:
Charles A. Claflin
by Wright Brown Quinby May
Attorneys.

No. 881,548. PATENTED MAR. 10, 1908.
C. A. CLAFLIN.
AIR EXHAUSTING LIQUID SUPPLY APPARATUS.
APPLICATION FILED OCT. 9, 1907.
2 SHEETS—SHEET 2.

UNITED STATES PATENT OFFICE.

CHARLES A. CLAFLIN, OF MEDFORD, MASSACHUSETTS.

AIR-EXHAUSTING LIQUID-SUPPLY APPARATUS.

No. 881,548.　　　　　Specification of Letters Patent.　　　Patented March 10, 1908.

Application filed October 9, 1907. Serial No. 396,555.

*To all whom it may concern:*

Be it known that I, CHARLES A. CLAFLIN, of Medford, in the county of Middlesex and State of Massachusetts, have invented certain new and useful Improvements in Air-Exhausting Liquid - Supply Apparatus, of which the following is a specification.

This invention has for its object to enable a liquid supplying faucet to perform the additional function of exhausting air from a vacuum chamber or element of an apparatus for utilizing a vacuum or partial vacuum.

The invention is embodied in a cock or faucet having a liquid inlet and outlet, an intermediate air inlet, means for causing the flow of liquid through the casing to induce an inflow of air through the air inlet, means for controlling the flow of liquid through the casing and means for automatically closing the air inlet when the flow of liquid and the flow of air induced thereby cease, so that the partial vacuum produced by the operation of the faucet in a vacuum tank with which the air inlet is connected, may be maintained. When the faucet is performing its ordinary function of supplying liquid, a flow of air into the casing is induced by the flow of liquid therethrough, the air and liquid passing together from the outlet of the casing.

The invention is also embodied in an apparatus which includes a plurality of faucets of the character above mentioned, and means connected with the air inlets of the several faucets for utilizing the vacuum caused by the action of the faucets or either of them.

The faucets may be the several water supply faucets used in a house, and the vacuum utilizing means may include a vacuum tank suitably connected with a steam heating system to maintain heat in the radiators of the heating system. By thus utilizing water supply faucets, such as those used in connection with kitchen sinks, lavatories, flushing tanks, etc.. the employment of separate and special vacuum producing means or apparatus in connection with a steam heating system, is rendered unnecessary, it being possible to produce by a system of said faucets in a building and by the ordinary flow of water through such faucets, a vacuum as high as 29″, and of greater or less volume according to the water pressure and the quantity of water drawn in a given time.

Of the accompanying drawings, forming a part of this specification, Figure 1 represents a sectional view of one form of air exhausting faucet embodying my invention. Fig. 2 represents a section on line 2—2 of Fig. 1. Fig. 3 represents a sectional view of a form of faucet embodying my invention, suitable for use as a so-called ball cock, in connection with a water closet flushing tank. Fig. 4 represents a section on line 4—4 of Fig. 3. Fig. 5 represents a sectional view of another type of faucet embodying my invention. Fig. 6 represents in elevation an air exhausting liquid supply apparatus, which includes a plurality of the said faucets and a vacuum tank connected therewith and with a steam heating system.

The same letters of reference indicate the same parts in all the figures.

For convenience I will use the term "faucet" as characterizing each form of liquid controlling device shown in the drawings, whether the same be for the supply of water at a kitchen sink, wash bowl, etc., as shown in Figs. 1 and 2, or for supplying a flushing tank, as shown in Figs. 3 and 4, or for controlling the flow of liquid through a conduit, as shown in Fig. 5.

Referring first to Figs. 1 and 2, 12 represents a casing having a liquid inlet 13, an outlet 14, and an air inlet 15 located between the inlet 13 and outlet 14. The casing is provided between the liquid inlet and the outlet with means for causing the flow of liquid through the casing to induce an inflow of air through the air inlet 15, the air mingling with the liquid, and flowing therewith through the outlet 14. The said means in the best embodiment of my invention of which I am at present aware, comprise a jet-forming nozzle 16 communicating with the inlet 13 through branched passages 17, and a combining nozzle 18 separated from the jet-forming nozzle 16 by an air space 19 which communicates with the air inlet 15. The nozzles 16 and 18 are tapered, as shown in Fig. 1, and each is preferably detachably secured to the faucet casing 12 by a screw-thread connection, so that the nozzles may be removed whenever this is desirable. The relative arrangement of the nozzles 16 and 18 and air chamber 19 is such that a jet of water formed by the nozzle 16, is projected across the air chamber into the combining nozzle, and induces a flow of air through the inlet 15 into the air chamber 19, the air mingling with the jet of water in the combining nozzle, and passing out with the water through the outlet 14. The valve 21 which controls the flow of liquid through the faucet, is adapted to close upon a seat 22, which is located between the liquid inlet 13 and jet-forming nozzle 16, so that when the valve is closed, the flow of liquid through the nozzle 16 ceases.

It will be seen that whenever the faucet is performing its ordinary function, an inflow of air is induced through the air inlet 15, this inflow ceasing when the faucet is closed. In Figs. 3 and 4 I show a faucet of the character ordinarily known as a ball cock, the valve of the faucet being opened and closed by the downward and upward movements of a float lever 23 in a flushing tank 24, such as is commonly used in water closets. In this embodiment of the invention, 25 is the casing of the faucet, 26 is the jet-forming nozzle, 27 is the combining nozzle, 28 is the air chamber between the nozzles 26 and 27, and 29 is the air inlet communicating with the air chamber 28. The valve 30 which controls the flow of liquid through the faucet, is mounted on a plunger 31 connected with the float lever 23 in the usual or any suitable manner. When the valve is opened the flow of liquid through the faucet into the flushing tank, induces a flow of air through the inlet 29.

In Fig. 5 I show a faucet adapted to serve as a shut-off in a water pipe or conduit, and having a casing 32 containing a jet-forming nozzle 33 and a combining nozzle 34, said casing having a liquid-inlet 35, an air inlet 36 and a shut-off valve 37 between the liquid inlet and the jet-forming nozzle. The operation of this type of faucet is the same as that of the others.

In Fig. 6 I show a system which includes the two faucets shown in Figs. 1 and 3, a vacuum chamber 38 which is connected by a pipe 39 with the air inlets 15 and 29 of said faucets, radiators 40 having suitable pipe connections with the vacuum chamber, said radiators forming part of a steam heating system, which includes a boiler 41 and suitable steam conducting pipes connecting the boiler with the radiators. The vacuum tank 38 may be suitably connected with the radiators, the steam piping and the boiler. Suitable check vlaves 42 are employed to prevent a back flow of air to the vacuum chamber when the faucets are not in operation.

The vacuum faucets may, if desired, be connected directly to the radiators, suitable check valves and thermostatic valves being employed between the faucets and the radiators to prevent air from returning to the radiators after having been withdrawn therefrom by the action of the faucets, and also to prevent steam from flowing through the air pipes to the faucets after steam generation and circulation have commenced.

The air inlet 15 in each embodiment of my invention, constitutes a part of a conduit adapted to be connected with a vacuum chamber (which may be a steam radiator), the operation of the faucet inducing a flow of air from said chamber. The said conduit in each case is provided with means such as a check valve 42, whereby it may be closed to prevent a back flow of air to said chamber when the operation of the faucet ceases.

It will be understood that the amount of vacuum produced is dependent on the number of faucets employed and the extent to which the faucets are used.

It will be seen that the faucets may be used only for the supply of liquid when a vacuum production is not desired.

My invention above described may be utilized for other purposes, and is not limited to use in connection with a heating system.

I claim:

1. An air-exhausting apparatus, comprising a faucet or cock casing having a liquid inlet, an outlet, an intermediate air inlet, means for causing the flow of liquid through said casing to induce an inflow of air through the air inlet, and a liquid-controlling valve adapted to shut off the liquid between the liquid inlet and the air inlet, the said air inlet forming a part of an air conduit adapted for connection with a vacuum chamber, and means for closing said conduit to prevent a back flow of air therethrough.

2. An air-exhausting apparatus, comprising a faucet or cock casing having a liquid inlet, an outlet, an intermediate air inlet, means for causing the flow of liquid through said casing to induce an inflow of air through the air inlet, and a liquid-controlling valve adapted to shut off the liquid between the liquid inlet and the air inlet, the said air inlet forming a part of an air conduit adapted for connection with a vacuum chamber, and a vacuum-maintaining check valve controlling the air in said conduit.

3. An air-exhausting faucet or cock, comprising a casing having a liquid inlet, an outlet, a jet-forming nozzle communicating with the liquid inlet, a combining nozzle between the outlet and the jet-forming nozzle, and separated from the latter by an air space, an air inlet communicating with said air space, and a liquid-controlling valve between the jet-forming nozzle and the liquid inlet, the relative arrangement of said nozzles and air space being such that a jet of liquid is projected across the air space into the combining nozzle, and induces an inflow of air through the air inlet.

4. An air-exhausting liquid-supply apparatus, comprising a plurality of faucets, each having a liquid inlet, an outlet, an intermediate air inlet, means for causing the flow of liquid through the casing to induce an inflow of air through the air inlet, and means for shutting off the liquid between the liquid and air inlets, a vacuum tank, pipe connections between said tank and the several faucets, and vacuum-maintaining check valves controlling said air inlets.

In testimony whereof I have affixed my signature, in presence of two witnesses.

CHARLES A. CLAFLIN.

Witnesses:
EDWARD E. PARKER,
ORLANDO F. DE SHON.